United States Patent [19]

Wilkins et al.

[11] 3,855,179

[45] Dec. 17, 1974

[54] STABILIZATION OF VINYL CHLORIDE POLYMERS

[75] Inventors: Anthony James Wilkins; Peter Albert Theodore Hoye, both of Stourbridge, England

[73] Assignee: Albright & Wilson Limited, Oldbury, England

[22] Filed: Sept. 21, 1973

[21] Appl. No.: 399,410

Related U.S. Application Data

[63]. Continuation-in-part of Ser. No. 379,742, July 16, 1973, abandoned, which is a continuation of Ser. No. 839,072, July 3, 1969, abandoned.

[52] U.S. Cl. ............................ 260/45.75 K, 252/406
[51] Int. Cl. ............................................ C08f 45/62
[58] Field of Search ............... 260/45.75 K; 252/406

[56] References Cited
UNITED STATES PATENTS

2,648,650  8/1953  Weinkerg et al. ............... 260/45.75
3,349,109  10/1967  Lach ............................... 260/45.75

Primary Examiner—V. P. Hoke
Attorney, Agent, or Firm—Robert P. Auber; Kenneth G. Wheeless; Robert Spector

[57] ABSTRACT

Vinyl chloride polymers stabilized against the degradative effects of heat contain between 0.5 percent and 5 percent by weight of a two-component stabilizer containing 5 to 50%, based on total stabilizer weight, of di-n-butyl- or di-n-octyl- S,S'-bis(isooctylmercaptoacetate), the remainder of said stabilizer consisting of di-n-butyl- or di-n-octyltin- S,O- mercaptoacetate. The degree of stabilization imparted by these mixtures is at least as good as that imparted by an equal weight of the superior stabilizer alone. Moreover, the initial appearance of heat-induced discoloration is delayed.

2 Claims, No Drawings

STABILIZATION OF VINYL CHLORIDE POLYMERS

BACKGROUND

This application is a continuation-in-part of application Ser. No. 379,742, filed July 16, 1973, and now abandoned which in turn is a streamlined continuation of our application, Ser. No. 839,072, filed July 3, 1969 and now abandoned.

This invention relates to the stabilization of polyvinyl chloride resins wherein an organotin compound is used as primary stabilizer.

The use of organotin compounds as primary stabilizers for homopolymers and copolymers of vinyl chloride, has been known for many years. It is generally recognized that the most effective organotin stabilizers are the organotin mercaptides. Particularly effective compounds within this class are the diorganotin S,S'-bis(mercaptocarboxylate esters) of the general formula $R_2Sn(SACO_2R')_2$ wherein each R is a hydrocarbon group, A is a divalent hydrocarbon radical and R' is the residue of an alcoholic compound R'OH. Examples of such compounds that have achieved commercial acceptance are dibutyltin S,S'-bis-(isooctyl mercaptoacetate), dibutyltin S,S'-bis-(nonyl mercaptoacetate), the corresponding dioctyltin mercaptoacetates and the corresponding dibutyltin and dioctyltin mercaptopropionates.

It has also been proposed to employ as stabilizers for polyvinyl chloride the cyclic organotin compounds prepared by the reaction of a diorganotin oxide with mercaptoacetic or mercaptopropionic acid. The products of this reaction are diorganotin, S,O-mercaptocarboxylates of the general formula

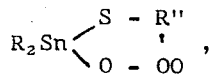

wherein each R is as defined above and R'' is a methylene or ethylene radical. These cyclic compounds are considered to be inferior stabilizers with respect to the aforementioned diorganotin S,S'-bis(mercaptocarboxylate esters) and have therefore not achieved widespread commercial acceptance.

It has now surprisingly been found that certain combinations of the above-described diorganotin S,S'-bis(mercaptocarboxylate esters) and the cyclic diorganotin-S,O-mercaptoacetate impart a degree of stabilization which is considered to be synergistic in that a mixture of the two types of stabilizers is employed, the stabilized effect obtained is at least equivalent to that obtained using either of the individual stabilizers in an amount to provide an equivalent tin content or an equal weight of stabilizer in the resin composition.

SUMMARY OF THE INVENTION

The present invention provides a two-component stabilizer composition for use with homopolymers of vinyl chloride and copolymers containing vinyl chloride as the major component thereof together with one or more ethylenically unsaturated monomers, the stabilizer composition consisting of between 50 and 95 percent, based on the weight of said composition, of a diorganotin compound selected from the group consisting of di-n-butyltin S,S'-bis(isooctyl mercaptoacetate) and di-n-octyltin S,S'-bis(isooctyl mercaptoacetate), the remaining 5 to 50 percent by weight of said composition consisting of a compound selected from the group consisting of di-n-butyltin S,O-mercaptoacetate and di-n-octyltin S,O-mercaptoacetate.

This invention also provides vinyl chloride polymer compositions which contain between 0.5 and 5 percent, based on the weight of polymer, of one of the aforementioned stabilizer compositions, with the proviso that the concentration of diorganotin S,O-mercaptoacetate does not exceed 1 percent, based on the weight of polymer.

DETAILED DESCRIPTION

The present mixtures of stabilizers can be obtained in two ways. Firstly, a diorganotin reactant may be combined with an appropriate mixture of isooctyl mercaptoacetate and the free mercaptoacetic acid. Secondly, the diorganotin S,S'-bis(isooctyl mercaptoacetate) and the diorganotin-S,O mercaptoacetate may each be made separately and then incorporated separately or as a previously prepared mixture into the vinyl chloride polymer. In theory it would seem possible also to make the desired mixture by reacting a suitable di-n-octyl or di-n-butyltin derivative with isooctyl mercaptoacetate under conditions which favor a partial hydrolysis of the carboxylate group during the reaction. The free mercaptoacetic acid thereby produced would then react with some of the diorganotin compound. However, besides the difficulties of controlling such a reaction to provide the desired ratio of the two organotin compounds in the resulting mixture, the hydrolysis would yield a free alcohol. The alcohol contains 8 carbon atoms and may not be readily separated from the resulting reaction mixture. The presence of the alcohol in substantial amounts is undesirable, since it has been observed that isooctanol has a deleterious effect on the stabilizing efficiency of the organotin compounds. Accordingly, there should be present at the most 2 percent of the alcohol based on the weight of the diorganotin S,S'-bis (isooctyl mercaptoacetate) if adverse effects are to be avoided.

The first component of the present stabilizer compositions is a diorganotin S,S'-bis(isooctyl mercaptoacetate). This class of compounds is conveniently prepared using a procedure disclosed in U.K. No. 719,733 (as originally published), which involves heating the reactants at reflux temperature until the reaction is complete and thereafter purifying the product by vacuum stripping. A reaction solvent such as toluene is often conveniently employed. The first component stabilizer may also be prepared by reacting the corresponding diorganotin dihalide with isooctyl mercaptoacetate in the presence of a hydrogen halide acceptor, for example, sodium hydroxide or a tertiary amine, also as described in the said No. 719,733.

The second component stabilizer is a cyclic compound of the formula

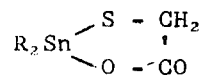

wherein R represents a butyl or an octyl radical. These compounds are conveniently obtained by reaction of a di-n-butyl- or di-n-octyltin oxide with mercaptoacetic acid using substantially equimolar amounts of reactants and conditions similar to those described for the production of the first component. Suitable reaction conditions are set out in the aforesaid British No. 719,733. As is true for the first component, the cyclic compounds can also be prepared by reacting the corresponding diorganotin dihalide with the free mercapto acid in the presence of a hydrogen halide acceptor.

The first component stabilizer is present in an amount of from 50 to 95 percent by weight, based on the total stabilizer composition, but an amount of from 10–25 percent by weight on this basis appears usually to give an optimum synergistic effect.

A mixture containing the aforementioned first and second component stabilizers can be prepared by reacting a diorganotin oxide with the desired amounts of isooctyl mercaptoacetate and mercaptoacetic acid. Alternatively the corresponding diorganotin dihalide may be employed in the presence of a hydrogen halide acceptor.

Alternatively, the present stabilizer compositions can be prepared by mixing appropriate quantities of the separately prepared stabilizers. The mixing operation may be carried out at any time. If desired, the mixture may be made in situ in the polyvinyl chloride resin by milling in thereto each stabilizer separately.

The present vinyl chloride polymers are prepared using 80 to 100 percent, based on total monomer weight, of vinyl chloride. Suitable comonomers include vinyl esters of monocarboxylic acids, e.g. vinyl acetate, and acrylonitrile.

The present synergistic compositions can be employed to stabilize either rigid, semi-rigid or plasticized vinyl chloride polymers. The polymer composition may also contain conventional plasticizers such as dioctyl phthalate and conventional lubricants such as polyethylene wax. Auxiliary stabilizers may also be present, for example phenols, phosphites, epoxy compounds, amines and other classes of known stabilizers for vinyl chloride polymers.

The invention and the synergistic results obtained thereby are illustrated by the following Examples in which quantities are expressed on a weight basis.

EXAMPLE I

An amount as indicated in Table 1 of di-n-butyltin S,S′-bis-(iso-octylmercaptoacetate) (A) and/or cyclic di-n-butyltin S,O-mercaptoacetate (B) was milled into 100 parts of polyvinyl chloride (sold under the trade name Corvic D57/15) for 10 minutes at 150°–155°C. Samples of the PVC sheet were aged in an air-filled oven at 200°C and removed at specified intervals. The color ratings of the heat treated samples are set forth in Table I. The colors are rated in accordance with the Gardner color scale using glass color discs numbered from 0 (water-white) to 9 (orange-yellow).

TABLE I

| Test No. | 1 | 2 | 3 | 4 |
|---|---|---|---|---|
| Stabilizer (Amount) | | | | |
| A | 2.0 | 1.5 | 1.5 | 0 |
| B | 0 | +0.5 | +0.25 | 2.0 |
| Color after heating time at 200°C (Minutes) | | | | |
| 0 | 0 | 0 | 0 | 3 |
| 15 | 4 | 1 | 2 | 7 |

TABLE I-Continued

| Test No. | 1 | 2 | 3 | 4 |
|---|---|---|---|---|
| Stabilizer (Amount) | | | | |
| 20 | 5 | 2 | 3 | 8 |
| 25 | 6 | 3 | 5 | 9 |
| 30 | 7 | 6 | 6 | >9 |
| 35 | 9 | >9 | >9 | >9 |

EXAMPLE II

The procedure of Example I was repeated but using di-n-octyl S,S′-bis-(iso-octyl mercaptoacetate) (C) above and in combinations with cyclic di-n-octyl S,O-mercaptoacetate (D). The Gardner color ratings are set forth in Table II.

TABLE II

| Test No. | 5 | 6 | 7 |
|---|---|---|---|
| Stabilizer (Amount) | | | |
| C | 2.0 | 1.9 | 1.8 |
| D | 0 | 0.06 | 0.12 |
| Color after heating time at 200°C (Minutes) | | | |
| 0 | 0 | 0 | 0 |
| 10 | 0 | 0 | 0 |
| 15 | 3 | 2 | 1 |
| 20 | 5 | 3 | 3 |
| 25 | 7 | 7 | 6 |
| 30 | 9 | 9 | >9 |
| 35 | >9 | >9 | >9 |

EXAMPLE III

Stabilizer compositions E-G contained an intimate mixture of stabilizers C and D and were prepared by reacting the amounts of di-n-octyltin oxide, iso-octyl mercaptoacetate and mercaptoacetic acid specified in Table III. The Table also records the results obtained when 2 parts of each of these stabilizers and stabilizer C alone were incorporated into 100 parts of polyvinyl chloride (as sold under the trade name Corvic D 55/9) and the resulting milled sheets subjected to the heat aging procedure of Example I.

TABLE III

| Test No. | 8 | 9 | 10 | 11 |
|---|---|---|---|---|
| Stabilizer | C | E | F | G |
| Stabilizer Ingredients | | | | |
| Dioctyltin oxide(parts) | 90 | 90 | 180.5 | 180.5 |
| Iso-octyl mercaptoacetate (parts) | 102 | 91 | 173.4 | 163.2 |
| Mercaptoacetic acid(parts) | 0 | 4.5 | 6.9 | 9.2 |
| Color after heating time at 200°C (Minutes) | | | | |
| 0 | 0 | 0 | 0 | 0 |
| 10 | 0 | 0 | 0 | 0 |
| 15 | 4 | 1 | 0 | 1 |
| 20 | 5 | 4 | 3–4 | 4 |
| 25 | 6 | 5–6 | 5 | 7 |
| 30 | 9 | 9 | 8 | 8 |

The results of Tests Nos. 2, 3, 6, 7, 9, 10 and 11 demonstrate the superior stabilizing effectiveness of the present compositions, as evidenced by the longer period of heating that can be withstood before significant discoloration of the test sample occurs.

EXAMPLE IV

The present stabilizer compositions were evaluated by varying the percentage concentration of first component from 50 to 95 percent, based on total stabilizer weight. The amount of total stabilizer in the test sample was varied from 0.5 to 5 percent, based on the weight of polyvinyl chloride. In all instances the rolls of the mill used to blend the stabilizer with the resin were heated to 164°C. and the air-filled oven was maintained at a temperature of 192°C. All samples contained 0.5 part of a polyethylene wax as a lubricant.

The colors of the heated-treated samples were rated using the following numerical scale:

7+ - white, resembles non-heat treated polymer
7 - less white than 7+
6 - off-white
5 - slight degree of yellowing
4 - definite yellow-brown color
3 - deep yellow-brown color
2 - deep brown color
1 - dark brown to black color The component stabilizers evaluated were di-n-octyltin-S,S'-bis(isooctyl mercaptoacetate) (stabilizer C) and di-n-octyltin-S,O-mercaptoacetate (stabilizer D).

coloration is evident in any of the mixed stabilizer samples during the first 10 minutes of heat treatment. Discoloration does not appear until the 25 minute observation point in two of the three mixed stabilizer samples. The superior control exhibited some discoloration following 15 minutes of heating. The rating of 7+ for the test samples indicates that their color was considered superior to that of the best control.

The control test samples 24 and 25 contain more than 1 part of di-n-octyltin S,O-mercaptoacetate. These samples do not exhibit the improved stabilization observed when the concentration of diorganotin S,O-mercaptoacetate is at or below the critical limit of 1 part per 100 parts of polymer (viz. test No. 20).

What is claimed is:

1. A vinyl chloride polymer composition stabilized against the deteriorative effects of heat wherein the vinyl chloride polymer contains between 80 and 100 percent by weight of repeating units derived from vinyl chloride, the remaining 0–20 percent being derived from ethylenically unsaturated monomers copolymerizable with vinyl chloride, and wherein a two-component stabilizer is present in an amount between 0.5 and 5 percent, based on the weight of vinyl chloride polymer, said stabilizer consisting of between 50 and 95 percent, based on the total stabilizer weight, of di-n-butyltin-S,S'-bis(isooctyl mercaptoacetate) or di-n-octyltin-S,S'-bis(isooctyl mercaptoacetate), the remaining portion of said stabilizer consisting of di-n-butyltin-S,O-mercaptoacetate or di-n-octyltin S,O-mercaptoacetate, with the proviso that the concentration of diorganotin S,O-mercaptoacetate does not ex-

TABLE IV

| Test Number | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|
| Stabilizer (parts): | | | | | | | | | | | | | | | |
| C | 1 C | 0.5 | 0.475 | 0.375 | 0.25 | 1 C | 2 | 1.9 | 1.5 | 1.0 | 1 C | 0 | 4.75 | 3.75 | 2.5 | 1 C |
| D | | 0 | 0.025 | 0.125 | 0.25 | 0.5 | 0 | 0.1 | 0.5 | 1.0 | 2.0 | 0 | 0.25 | 1.25 | 2.5 | 5 |
| Color after heating at 192° C. (minutes): | | | | | | | | | | | | | | | | |
| 0 | 6 | 7 | 7 | 7 | 5 | 7 | 7+ | 7+ | 7+ | 6+ | 7 | 7 | 7 | 6+ | 5+ |
| 5 | 6 | 7 | 7 | 7 | 5 | 7 | 7+ | 7+ | 7+ | 6+ | | | | | |
| 10 | 5 | 6+ | 6+ | 6+ | 5 | 7 | 7+ | 7+ | 7+ | 6 | | | | | |
| 15 | 4 | 5 | 5 | 5 | 5 | 6+ | 7 | 7 | 7 | 6 | 7 | 7 | 6 | 5 |
| 20 | 3 | 3+ | 4 | 5 | 4+ | 6 | 7 | 7 | 6+ | 5 | | | | | |
| 25 | 2 | 2 | 3 | 4 | 3 | 5 | 6 | 6 | 6+ | 4 | | | | | |
| 30 | 2 | 2 | 2 | 3 | 3 | 5 | 5 | 6 | 5+ | 4 | 6+ | 7 | 6 | 5 | 3+ |
| 45 | | | | | | | | | | | 6 | 6+ | 5 | 4 | 2+ |

1 C = Controls.

At a total stabilizer concentration of 0.5 parts by weight per 100 parts of polymer, the heat stability imparted by all of the stabilizer combinations are at least as good as the superior stabilizer (C) used alone. Moreover, the samples containing the combined stabilizers did not develop any discoloration during milling and the first 5 minutes of heat treatment in the oven. Both controls became discolored during the milling operation.

At a total stabilizer concentration of 2 parts per 100 parts of polymer, all combinations are at least as good as the superior stabilizer alone during the first 15 minutes of heat treatment in the oven. Moreover, no disceed 1 percent, based on the weight of vinyl chloride polymer.

2. A two-component composition for stabilizing homopolymers of vinyl chloride and copolymers thereof containing 80–100 percent by weight of repeating units derived from vinyl chloride, the remaining 0–20 percent being derived from copolymerizable ethylenically unsaturated monomers, said two-component composition consisting of between 50 and 95 percent, based on the weight of said composition of di-n-butyltin-S,S'-bis(isooctyl mercaptoacetate) or di-n-octyltin-S,S'-bis(isooctyl mercaptoacetate), the remaining portion of said stabilizer consisting of di-n-butyltin-S,O-mercaptoacetate or di-n-octyltin S,O-mercaptoacetate.

* * * * *